Patented May 10, 1927.

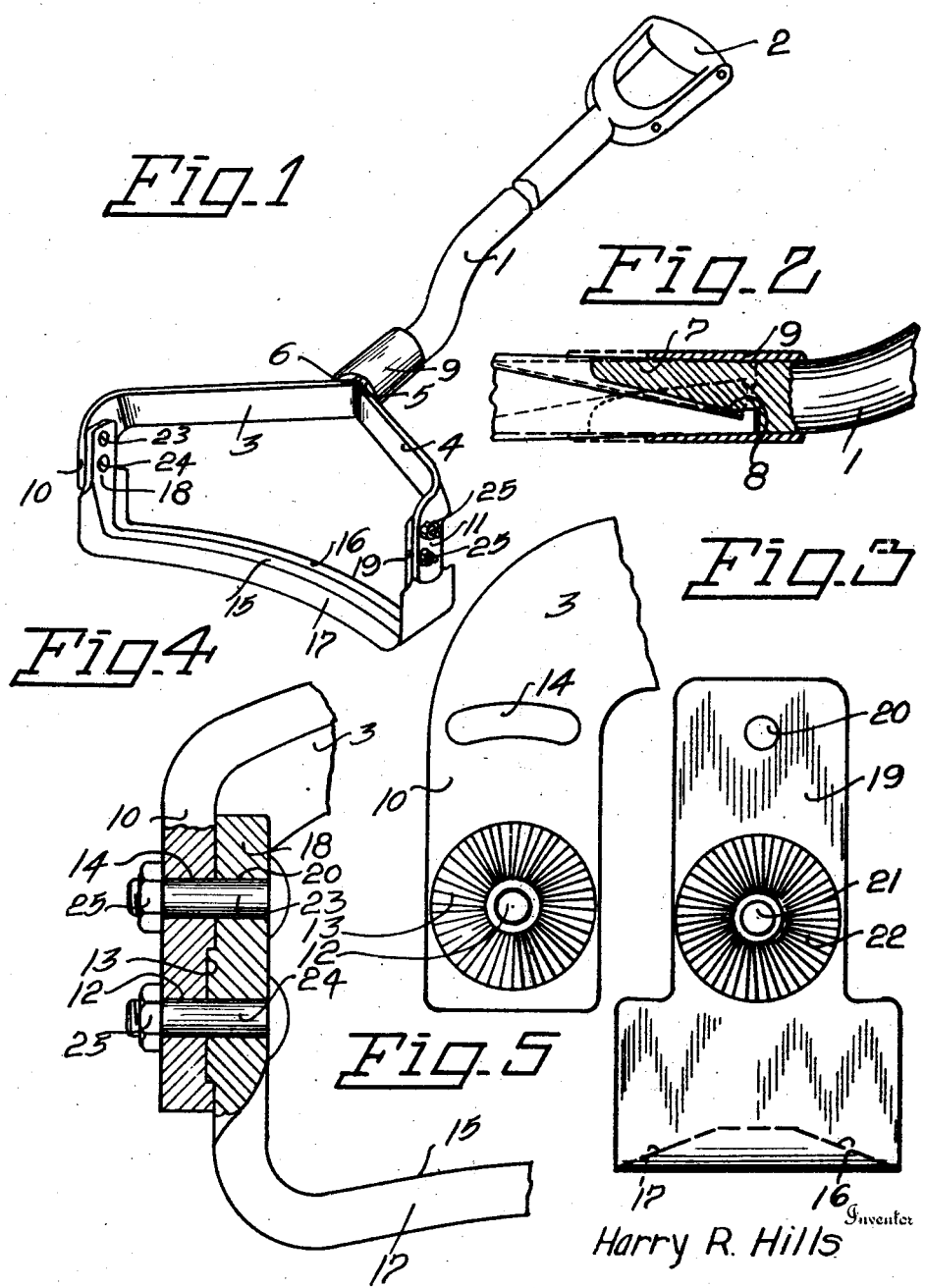

1,627,901

UNITED STATES PATENT OFFICE.

HARRY R. HILLS, OF EMERALD, IDAHO.

BARK PEELER.

Application filed October 20, 1924. Serial No. 744,626.

My present invention relates to improvements in bark peelers or implements for stripping the bark from trees, logs, poles &c. The implement is manually operated for the purpose of stripping the bark, as from a cedar pole, and embodies in its construction a double-edge knife blade that may be either drawn or pushed over the exterior surface of the pole to strip the bark therefrom.

The primary object of the invention is the provision of an implement of this character which is capable of facile adjustment of the stripping blade to present it at the proper angle to its work; which may be manipulated with facility in the two hands of the operator; and in which its parts may quickly be assembled or disjointed in case of repair, or for sharpening, when required.

The invention consists in certain novel combinations and arrangements of parts as will hereinafter be more fully pointed out and claimed.

In the accompanying drawings I have illustrated one complete example of the physical embodiment of my invention wherein the parts are combined and arranged according to the best mode I have thus far devised for the practical application of the principles of my invention.

Figure 1 is a perspective view of an implement embodying my invention, shown ready for use.

Figure 2 is an enlarged, sectional view of the head of the handle bar and securing ferrule, illustrating the manner of locking the knife fork to the handle head.

Figure 3 is an enlarged view at one end of the knife showing its side plate and clamping disk.

Figure 4 is an enlarged detail sectional view illustrating the manner of clamping the adjustable knife blade or cutter to its fork.

Figure 5 is a view at the inner side of a fork-arm showing its recess complementary to the disk of Fig. 3 and its slotted construction.

In the preferred form of my invention I have illustrated the implement in Figure 1 as a two-hand tool or implement utilizing a handle bar 1 and handle 2 of the shovel type.

A knife supporting fork made up of two diverging arms 3 and 4 of flat metal plates or straps is detachably secured to the handle bar, and these arms each have angularly disposed, hooked ends 5 and 6 that are joined in the wooden head 7 of the handle bar. The head 7 is fashioned with a pair of recessed slots 8 to receive the overlapping, tapered and hooked ends 5 and 6 of the arms, as shown in Fig. 2. After these ends have been inserted in their respective slots of the head 7 a metallic, cylindrical ferrule 9 is slipped over the head in frictional engagement therewith to lock the hooked ends in the head and form a stable joint for the handle bar and fork of the knife.

The arms 3 and 4 forming the fork are fashioned with angular side bars as 10 and 11 and each side bar has a bolt hole 12 therethrough and a concentric countersunk recess 13 at its inner side. An arcuate slot 14, struck from the bolt hole 12 as a center, is also fashioned in each side bar as best seen in Fig. 5.

I employ a knife blade 15 of sufficient length to insure proficient work, which preferably is curved to adapt it to the contour of a log or pole, and the blade is fashioned with a double cutting edge, one at each side of the blade as indicated at 16 and 17. By the utilization of the double edge knife the implement may be used with a reciprocating working stroke and the knife drawn toward the operator and alternately pushed from him to quickly strip the bark from a pole. The cutting edges are fashioned by beveling the top face of the blade as indicated, and these cutting edges may readily and with facility be sharpened as required.

At its ends the blade is fashioned with angular, integral plates 18 and 19 each having at its upper end a bolt hole 20 and a centrally located bolt hole 21 that is arranged concentrically with a boss or disk 22. These bosses or disks which are arranged to project from the outer faces of the plates are complementary to the countersunk recesses 13 of the side bars and are also corrugated to engage the similar faces of the recesses.

After the side bars of the fork and the end plates of the knife have been assembled as in Figure 4 they are rigidly clamped together by means of a pair of bolts 23 and 24 and secured by their nuts 25. The bolts 24 are passed through the holes 12 and 21 and the bolts 23 are passed through holes 20 and slots 14. By loosening the nuts 25 it will be apparent that the knife blade may swing on the bolts 24 as a center to adjust the blade at a desired angle. Then the nuts are tightened on their bolts to secure the parts in adjusted position. The fork is possessed of sufficient resiliency to permit this adjustment of parts, and to permit entire withdrawal of the knife blade when the nuts and bolts are loosened and withdrawn, as in case of renewal of parts or for sharpening the knife, or for other repairs.

The fork may be attached to the handle bar or detached therefrom with facility, and in Fig. 2 it will be seen that the ferrule is forced to dotted line position preparatory to separating the hooked ends of the fork from the handle bar, after which the tapered hooked ends of the fork arms may be separated from the head by withdrawing them from their respective slots. If desired another type of handle may be substituted, the hooked tapered ends again affixed in position and the ferrule slid again to locking position as in full lines Figs. 1 and 2.

Having thus fully described my invention, what I claim as new and desire to secure by Letters Patent is—

In a bark peeler the combination of a handle bar having a head and oppositely opening, spaced, overlapping slots arranged in parallel planes in said head, a fork having side bars and angular, parallel, oppositely-hooked ends in the overlapping slots, and a retaining ferrule enclosing the head and hooked ends.

In testimony whereof I affix my signature.

HARRY R. HILLS.